Nov. 4, 1952     D. F. HYLAND     2,616,559
PACKING ARTICLES, SUCH AS FISHING LURES MADE
OF FLEXIBLE SHEET MATERIAL
Filed April 15, 1949     2 SHEETS—SHEET 1

Daniel F. Hyland,
Inventor,
Haynes and Koenig,
Attorneys.

Nov. 4, 1952 D. F. HYLAND 2,616,559
PACKING ARTICLES, SUCH AS FISHING LURES MADE
OF FLEXIBLE SHEET MATERIAL
Filed April 15, 1949 2 SHEETS—SHEET 2

Daniel F. Hyland,
Inventor,
Haynes and Koenig,
Attorneys.

Patented Nov. 4, 1952

2,616,559

UNITED STATES PATENT OFFICE 2,616,559

PACKING ARTICLES, SUCH AS FISHING LURES, MADE OF FLEXIBLE SHEET MATERIAL

Daniel F. Hyland, St. Louis, Mo.

Application April 15, 1949, Serial No. 87,774

8 Claims. (Cl. 206—46)

This invention relates to the packaging of fishing lures, made of flexible sheet material.

Among the several objects of the invention may be noted the provision of a mode of packaging fishing lures cut from flexible sheet materials in convenient, attractive packages without waste of sheet materials in manufacture; the provision of packages of the class described which hold fishing lures in such manner that one may be readily removed from a package when desired without disturbing others in the package, the provision of a package of the class described for packaging in one convenient package fishing lures of different outlines and colors, with all lures in the package on display; and the provision of novel fishing lures made of flexible sheet material incorporated in a package such as described and having fish-attracting lure action when applied to a fish hook and drawn through the water. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Figs. 1–9 illustrate a series of blanks of sheet material from which fishing lures are cut in making packages of this invention, and also illustrate lures of the invention cut from the blanks;

Similar reference characters indicate corresponding parts throughout the several views of the drawings.

Figure 1:
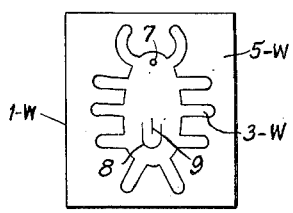
Figure 2:
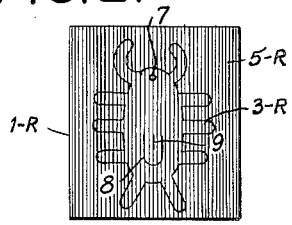
Figure 3:

Referring to the drawings, rectangular sheets or blanks of flexible sheet material, such as a flexible sheet plastic material, rubber, etc., are designated 1–W, 1–R and 1–G in Figs. 1, 2 and 3, respectively. As shown, the blanks 1–W, 1–R and 1–G are of the same size and shape, but of different colors—white, red and green, respectively. A die is employed to cut or punch identically shaped figures 3–W, 3–R and 3–G in the shape of a fishing lure from the respective blanks 1–W, 1–R and 1–G. As shown, these figures are of such outline as to resemble a hellgramite, a widely used fishing bait. The cut-out figures are illustrated in Figs. 1–3 prior to their removal from the blanks. They are identical except for color. When they are removed from the blanks, there remain frames 5–W, 5–R and 5–G, identical except for color, having apertures corresponding in shape to the hellgramite bait figure. The die employed to cut out the figures also cuts an aperture 7 in the head of each lure, a rearwardly directed tab 8 adjacent the rearward end of the lure, and a longitudinal split 9 in each tab, for attaching the lure to a fish hook.

Figure 4:
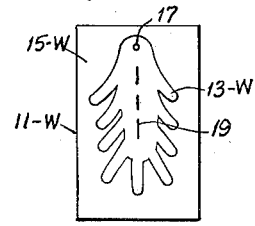
Figure 5:
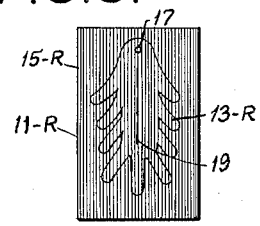
Figure 6:
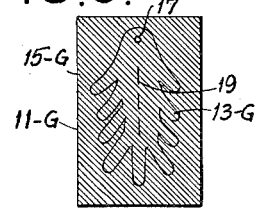

Rectangular sheets or blanks of the same materials as the blanks 1–W, 1–R and 1–G are designated 11–W, 11–R and 11–G in Figs. 4, 5 and 6, respectively. As shown, the blanks 11–W, 11–R and 11–G are of the same size and shape, but colored white, red and green, respectively. They are the same height as the blanks 1–W, 1–R and 1–G. A die is employed to cut or punch many-tailed fishing lures 13–W, 13–R and 13–G from the respective blanks 11–W, 11–R and 11–G. The cut-out lures are illustrated in Figs. 4–6 prior to their removal from the blanks. They are identical except for color. When they are removed from the blanks, there remain frames 15–W, 15–R, and 15–G, identical except for color, having apertures corresponding in shape to the many-tailed lure. The die employed to cut out the lures also cuts an aperture 17 in the head of each lure and longitudinally spaced longitudinally extending slits 19 in the body of each lure for stringing the lure on a fish hook.

Figure 7:
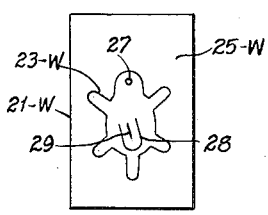
Figure 8:
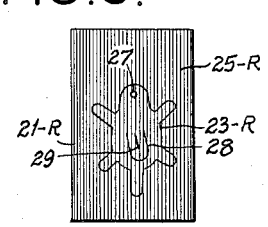
Figure 9:
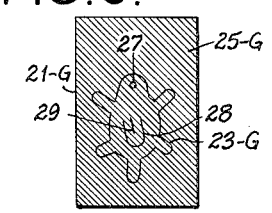

Rectangular sheets or blanks of the same materials as the blanks 1–W, 1–R and 1–G are designated 21–W, 21–R and 21–G in Figs. 7, 8 and 9, respectively. As shown, the blanks 21–W, 21–R and 21–G are of the same size and shape but colored white, red and green, respectively. Like the blanks in the 11 series, they are the same height as the 1–W, 1–R and 1–G blanks. A die is employed to cut or punch frog-shaped fishing lures 23–W, 23–R and 23–G from the respective blanks 21–W, 21–R and 21–G. The cut-out lures are illustrated in Figs. 7–9 prior to their removal from the blanks. They are identical except for color. When they are removed from the blanks, there remain frames 25–W, 25–R and 25–G, identical except for color, having apertures corresponding in shape to the frog-shaped lure. The die employed to cut out the lures also cuts an aperture 27 in the head of each lure, a rearwardly directed tab 28 adjacent the rearward end of each lure, and a generally longitudinally extending slit 29 in each tab, for stringing the lure on a fish hook. The tab 28, as illustrated, is cocked slightly at an angle to the longitudinal center line of the lure for the purpose of giving the lure, when the tab is bent out of the plane of the body, an erratic or spinning action in the water.

Figures 10, 11:
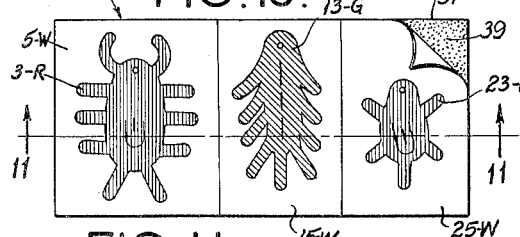
Fig. 10 is a plan of a package of the invention.
Fig. 11 is a section taken on line 11–11 of Fig. 10.
Figure 12:
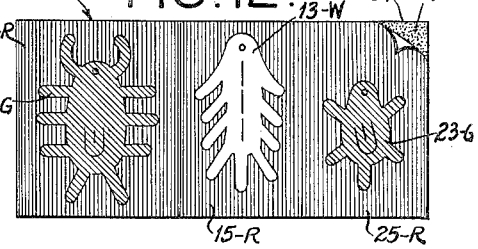
Figs. 12 and 13 illustrate other packages of the invention.
Figure 13:
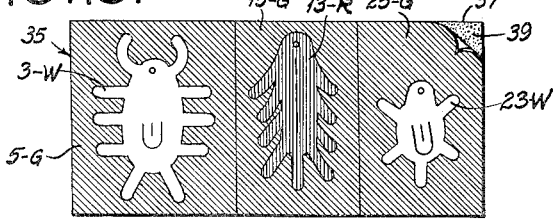

The nine cut-outs and nine frames above described are made up into the three packages 31, 33 and 35 illustrated in Figs. 10, 12 and 13, respectively. Referring first to Fig. 10, and Fig. 11, which is a section through Fig. 10, the package 31 is shown to comprise a flexible backing sheet 37 of paper or the like having a coating of pressure-sensitive adhesive 39 on one of its faces. The three white frames 5-W, 15-W and 25-W remaining from the cutting operations on the three white blanks 1-W, 11-W and 21-W are adhered side-by-side to the adhesive-coated side of the backing sheet, the three white lures 3-W, 13-W and 23-W having been removed. The red hellgramite lure 3-R, removed from the blank 1-R, is placed in the hellgramite-shaped aperture in the frame 5-W and detachably adhered to the backing sheet by the pressure-sensitive adhesive. Similarly, the green many-tailed lure 13-G and the red frog lure 23-R, having been removed from their respective green and red blanks, are placed in the many-tailed and frog shaped apertures in the frames 15-W and 25-W, respectively, and detachably adhered to the backing sheet by the pressure-sensitive adhesive. The backing sheet, which may be a strip of pressure-sensitive tape, is no larger than the outline of the assembled frames so that the frames and the lures occupying the apertures in the frames cover the adhesive. In the resultant package, the white frames form a white framing layer on the backing sheet, with the contrasting red and green lures occupying the apertures in the framing layer.

Referring to Fig. 12, the package 33 is shown to comprise a backing sheet 37 coated with pressure-sensitive adhesive 39. The three red frames 5-R, 15-R and 25-R remaining from the cutting operations on the three red blanks 1-R, 11-R and 21-R are adhered side-by-side to the backing sheet, the three red lures 3-R, 13-R and 23-R having been removed. The green hellgramite lure 3-G, removed from the blank 1-G, is placed in the hellgramite-shaped aperture in the frame 5-R and detachably adhered to the backing sheet by the pressure-sensitive adhesive. Similarly, the white many-tailed lure 13-W and the green frog lure 23-G, having been removed from their respective white and green blanks, are placed in the streamer and frog shaped apertures in the frames 15-R and 25-R, respectively. In the resultant package, the red frames form a red framing layer on the backing sheet, with the contrasting green and white lures occupying the apertures in the framing layer.

Referring to Fig. 13, the package 35 is shown to comprise a backing sheet 37 coated with pressure-sensitive adhesive 39. The three green frames 5-G, 15-G and 25-G remaining from the cutting operations on the three green blanks 1-G, 11-G and 21-G are adhered side-by-side on the backing sheet, the three green lures 3-G, 13-G and 23-G having been removed. The white hellgramite lure 3-W, the red many-tailed lure 13-R and the white frog lure 23-W, removed from their respective blanks 1-W, 11-R and 21-W, are placed in the hellgramite, streamer and frog shaped apertures in frames 5-G, 15-G and 25-G, respectively, and adhered to the backing sheet by the pressure-sensitive adhesive. In the resultant package, the green frames form a green framing layer on the backing sheet, with the contrasting red and white lures occupying the apertures in the framing layer.

The packages 31, 33 and 35 are convenient to carry, being flat and of such size that several of them may be readily carried by a fisherman in his pocket. Whenever a lure is wanted, the package may be bent to peel a marginal portion of the desired lure away from the backing sheet, whereupon the peeled-back portion may be grasped and the entire lure pulled off the backing sheet. The packages provide a convenient mode of supplying a fisherman with a large number of rules of different shapes, sizes and colors, and are attractive in appearance due to the color contrast between the lures and the framing layer. Instructions for the use of the lures or other data may be printed on the backs of the backing sheets. The packages are made up without any waste of material. The frames remaining after the cutting out of the lure figures are not disposed of as waste, but are used to cover the adhesive of the backing sheet and to provide a color contrast framing layer for the lures.

It will be understood that the shapes and colors of lures and frames as above described are only exemplary, and that many other lure shapes and colors may be utilized. It will also be understood that the number of lures in the above-described packages are only exemplary, and that a package may include more or fewer lures. In making large numbers of packages in commercial production, it will be understood that large numbers of differently colored lures would be cut from strips or sheets of different colors, and the strips or sheets, with the cut-out lures removed, used as framing layers on adhesive-coated backing sheets. While the invention is specifically illustrated in relation to packaging fishing lures cut from flexible sheet material, it is contemplated that many articles cut from flexible sheet material other than lures may be packaged in the same manner.

Figure 14:
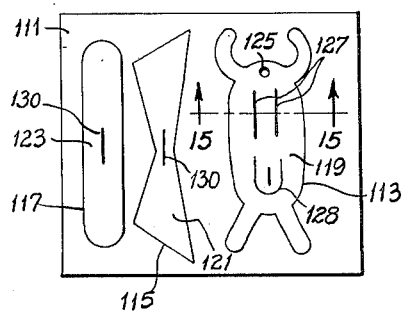
Fig. 14 is a plan view of a package of the invention including a so-called flat wing lure body and two different wings adapted to be assembled with the body.

Fig. 14 illustrates a package similar to the packages disclosed in Figs. 10, 12 and 13 providing a lure body and a selection of wings for assembling what I refer to as a flat wing lure or fly. As shown, this package comprises a frame 111 of flexible sheet material having apertures 113, 115 and 117 in the shape of a lure body and two differently shaped wing strips. A lure body 19 cut from flexible sheet material of different color from the framing layer 111 is disposed in aperture 113. Wing strips 121 and 123 cut from flexible sheet material of still different colors are disposed in the respective apertures 115 and 117. The frame, lure body and wing strips are adhered to a backing sheet in the same manner as illustrated in Fig. 11. The lure body has an aperture 125 and a tab 128 corresponding to the aperture 7 and tab 8 illustrated in Fig. 1. It also has a pair of parallel longitudinal slits 127 adjacent its forward end, the slits being spaced on opposite sides of the longitudinal center line of the body and being cut in parallel planes at right angles to the plane of the body.

To make up a flat wing fly, the lure body 119 and one of the wing strips, for example the wing strip 123, are peeled away from the backing sheet of the package. The wing strip is then inserted endwise through one of the slits 127, then through the other, and pulled through the slits to assume the centered, flat-wing position illustrated in Fig. 15. It will be seen that the wing strip is retained in assembled relation with the lure body by the portion of the lure body between the slits 127.

Figure 15:
Fig. 15 is a section showing how a wing of Fig. 14 is assembled with the lure body of Fig. 14 to make a flat wing lure, the lure body being in section on line 15–15 of Fig. 14.
Figure 16:
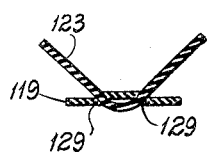
Fig. 16 is a section similar to Fig. 15 illustrating a so-called cocked-wing lure.

Fig. 16 illustrates a modification of the Fig. 15 lure wherein the lure body is modified so that the wings are cocked instead of being flat. This is accomplished by cutting the wing-receiving slits in divergent rather than parallel planes. In Fig. 16, the diverging slits are indicated at 129. The Fig. 16 lure otherwise is the same as the Fig. 15 lure. It will be seen that the wing strip, when inserted through the slits, provides wings which diverge upward and outward from the lure body, the divergence resulting from the divergence of the planes of cutting of the slits.

The wing strip may have a central slit, as indicated at 130, to receive the shank of the hook thereby positively to retain the wing assembled with the lure body.

Figure 17:
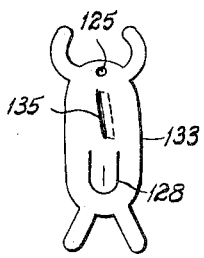
Fig. 17 is a plan view of the lure body of a so-called spinner wing lure.
Figure 18:
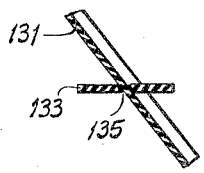
Fig. 18 is a section showing how a wing is assembled with the lure body of Fig. 17 to make a spinner wing lure.

Figs. 17 and 18 illustrate a further modification wherein a wing strip 131 is assembled with a lure body 133 in such manner as to make the lure body spin when drawn through the water. As shown, the lure body 133 is like the lure body 119 in all respects except that instead of having two parallel slits it has a single wing-receiving slit 135 which extends at an angle to and intersects the longitudinal center line of the lure body, and which is cut in a plane inclined to the plane of the lure body (for example, at 45°) rather than in a plane perpendicular to the plane of the lure body. Thus, when the wing strip is inserted through the slit, it is skewed with respect to the longitudinal direction of the lure body so that the latter will spin when drawn through the water.

It is contemplated that the lures may be impregnated with fish oil, anise or like aromatic fish-attracting substance.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A fishing lure package comprising a backing sheet having a coating of pressure-sensitive adhesive on one side, a framing layer of flexible sheet material having an aperture in the outline of a fishing lure and at least one aperture in the outline of a wing strip adhered to the adhesive-coated side of the backing sheet, the backing sheet closing the apertures on one side of the framing layer, a lure body cut from flexible sheet material of different color from the framing layer in the outline of the lure-shaped aperture in the framing layer occupying this aperture and removably adhered to the adhesive-coated side of the backing sheet, a wing strip cut from flexible sheet material of different color from framing the layer in the outline of the wing strip aperture in the framing layer occupying the wing strip aperture and removably adhered to the adhesive-coated side of the backing sheet, said lure body being slitted to receive said wing strip.

2. A package as set forth in claim 1, wherein the wing strip has a central slit.

3. A fishing lure package comprising a framing layer of flexible sheet material having an aperture and secured to a flexible backing sheet with the latter closing the aperture on one side of the framing layer, the portion of the backing sheet within the area of the aperture having pressure-sensitive adhesive thereon, and a fishing lure of flexible sheet material occupying the aperture and detachably adhered to the backing sheet by said pressure-sensitive adhesive.

4. A fishing lure package as set forth in claim 3 wherein the backing sheet has a coating of pressure-sensitive adhesive by which the framing layer is secured thereto, the portion of the coating within the bounds of the aperture constituting the pressure-sensitive adhesive by which the lure is detachably adhered to the backing sheet.

5. A fishing lure package comprising a framing layer of flexible sheet material having a plurality of apertures and secured to a flexible backing sheet with the latter closing the apertures on one side of the framing layer, the portion of the backing sheet within the areas of the apertures having pressure-sensitive adhesive thereon, and fishing lures of flexible sheet material in the outlines of the respective apertures in the framing layer occupying the respective apertures and detachably adhered to the backing sheet by said pressure-sensitive adhesive.

6. A fishing lure package as set forth in claim 5 wherein the backing sheet has a coating of pressure-sensitive adhesive by which the framing layer is secured thereto, the portion of the coating within the bounds of the apertures constituting the pressure-sensitive adhesive by which the lures are detachably adhered to the backing sheet.

7. A fishing lure package comprising a framing layer of flexible sheet material having a plurality of apertures and secured to a flexible backing sheet with the latter closing the apertures on one side of the framing layer, the portion of the backing sheet within the areas of the apertures having pressure-sensitive adhesive thereon, and fishing lures cut from flexible sheet material of different color from the framing layer in the outlines of the respective apertures in the framing layer occupying the respective apertures and detachably adhered to the backing sheet by said pressure-sensitive adhesive.

8. A fishing lure package as set forth in claim 7 wherein the backing sheet has a coating of pressure-sensitive adhesive by which the framing layer is secured thereto, the portion of the coating within the bounds of the apertures constituting the pressure-sensitive adhesive by which the lures are detachably adhered to the backing sheet.

DANIEL F. HYLAND.

REFERENCES CITED

The following references are of record in the file of this patent:

UNITED STATES PATENTS

| Number | Name | Date |
| --- | --- | --- |
| Re.6,621 | Ball | Aug. 31, 1875 |
| Re.18,488 | Mays | June 7, 1932 |
| 766,902 | Reese | Aug. 9, 1904 |
| 1,777,004 | Lemere | Sept. 30, 1930 |
| 1,968,328 | Stuparich | July 31, 1934 |
| 2,087,362 | Swift | July 20, 1937 |
| 2,119,343 | Myers | May 31, 1938 |
| 2,287,653 | Walker | June 23, 1942 |
| 2,372,994 | Welch | Apr. 3, 1945 |
| 2,434,545 | Brady, Jr., et al. | Jan. 13, 1948 |